June 6, 1939.                    J. J. BAIER                    2,161,693
              SPEED REGULATING DEVICE FOR PRIME MOVERS
              Filed April 24, 1937            2 Sheets-Sheet 1
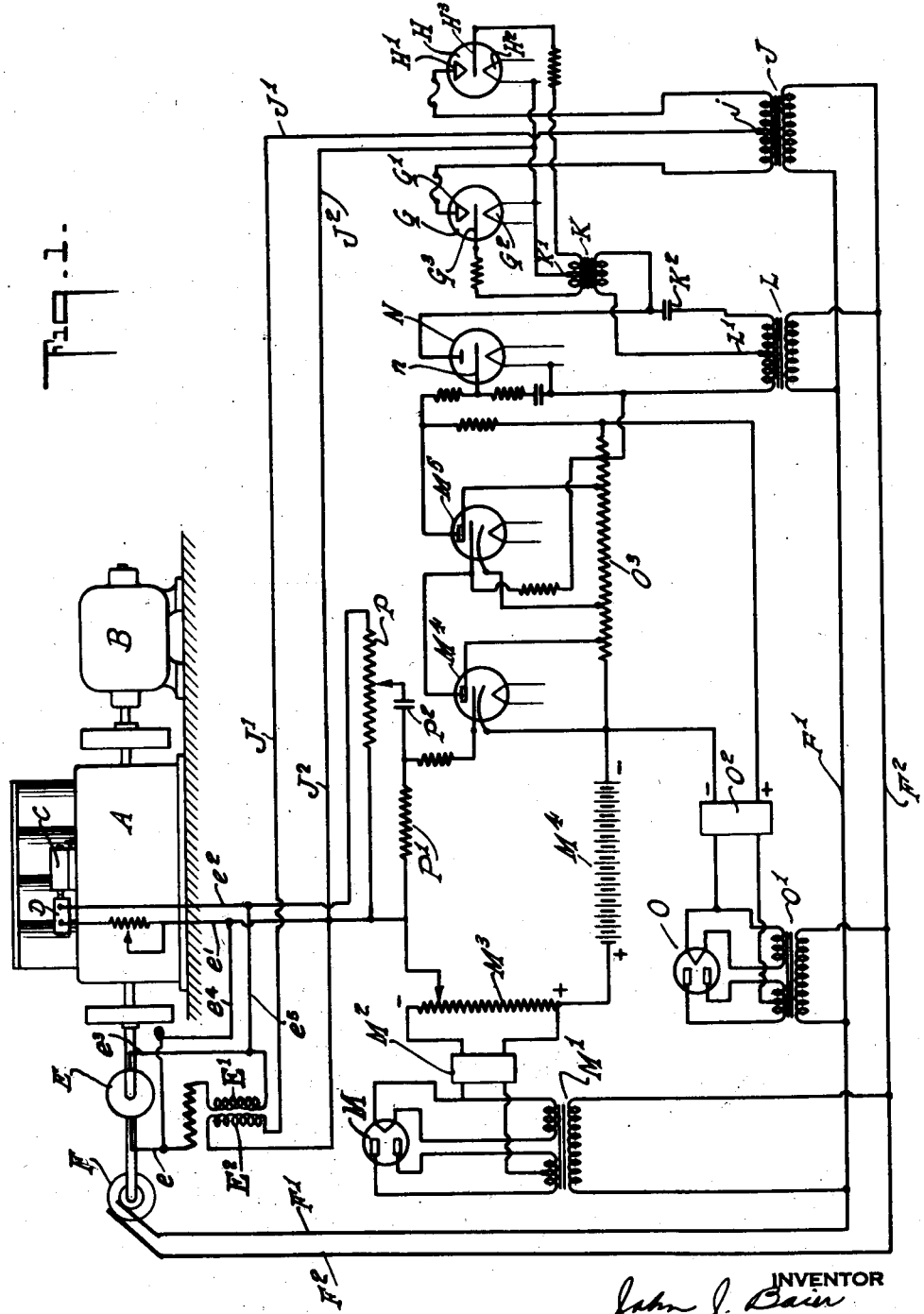
INVENTOR
John J. Baier
BY
Morrison, Kennedy & Campbell
ATTORNEYS June 6, 1939. J. J. BAIER 2,161,693
SPEED REGULATING DEVICE FOR PRIME MOVERS
Filed April 24, 1937 2 Sheets-Sheet 2
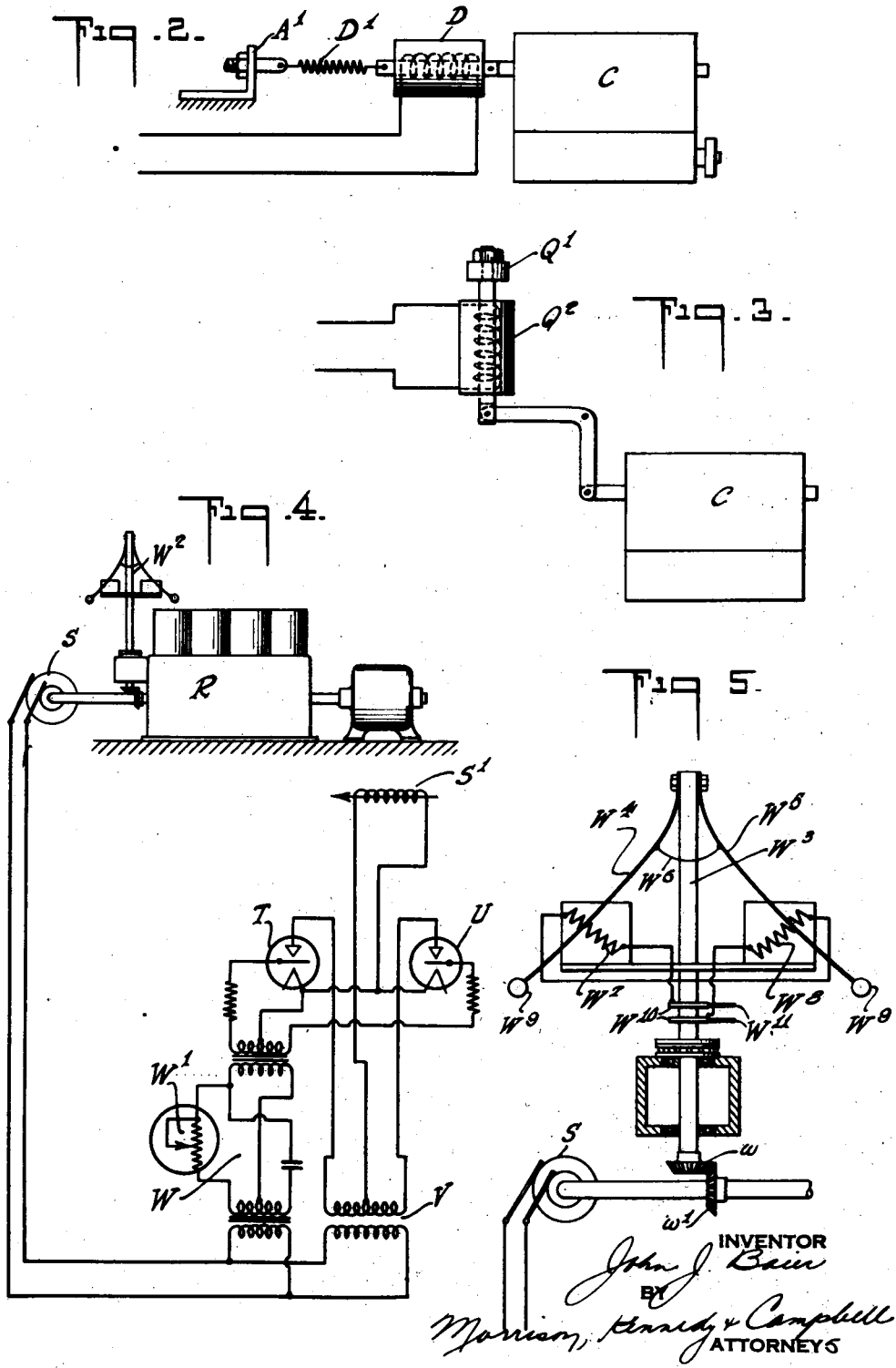
INVENTOR
John J. Baier
BY
Morrison, Kennedy & Campbell
ATTORNEYS Patented June 6, 1939

2,161,693

UNITED STATES PATENT OFFICE 2,161,693

SPEED REGULATING DEVICE FOR PRIME MOVERS

John J. Baier, Flushing, N. Y.

Application April 24, 1937, Serial No. 138,697

11 Claims. (Cl. 290—40)

This invention relates to speed regulating devices for prime movers, and more particularly to a regulator of the electronic type, which will cause the speed of such prime mover to be maintained accurately within a small percentage of error.

Although the present improvements are readily applicable to any throttle-controlled engine, they have been described and illustrated in connection with an internal combustion engine of the Diesel type, wherein the fuel is supplied to the cylinders by means of an injection pump. According to one embodiment of the present improvements, the rate of fuel feed of the injection pump is regulated by a solenoid energized by a direct current generator driven directly from the main shaft of the engine. The field circuit of the D. C. generator is in turn controlled from a small pilot A. C. generator likewise driven directly from the main shaft of the engine, through an intermediate electronic circuit, the arrangement being such that, as the output of the A. C. generator is increased as a result of an increase in speed of the engine, the current flowing through the solenoid is automatically decreased so as to reduce the flow of fuel to the engine and lower its speed to normal, and conversely, when the output of the A. C. generator is decreased, as a result of a decrease in speed of the engine, the current flowing through the solenoid is increased, thereby increasing the flow of fuel to the engine to raise its speed up to normal.

In the electronic circuit, there is provided a full wave rectifier, which rectifies the output of the A. C. generator. The rectified current is filtered and applied across a potentiometer in bucking relation to a source of constant voltage, as for instance, a battery. Variations in the potential across the potentiometer, resulting from variations in the output of the A. C. generator are amplified and the output voltage of the amplifier applied to the grid of a three element space discharge device which functions together with a condenser in series as a variable phase shifter to control the grid voltages of a pair of grid glow discharge devices connected in full wave rectification, the plate circuits of the discharge devices being energized from the A. C. generator and including in series the field coils of the direct current generator which energizes the solenoid. The grid glow discharge devices act in the capacity of a full wave rectifier energizing the field coils and, when the output of the A. C. generator is constant, the output of the D. C. generator will likewise be constant, under which circumstances, the solenoid will have a fixed bias maintaining the feed of the fuel pump constant. However, when variations in engine speed occur, due to, say, an increased or decreased load thereon, a proportionate variation in the output of the A. C. generator will result, which expresses itself as a variation in the voltage difference across the potentiometer. This voltage change, when amplified and applied to the phase shifter, will effect the control of the grid glow discharge devices in such a way that the output thereof will increase or decrease in inverse ratio to the output of the A. C. generator. As a result, any tendency of the engine to depart from a set speed is immediately compensated for in such a way that the set speed is maintained substantially constant at all times. At least the variation will be well under 1%, which is adequate for maintaining the frequency of an alternating current generator driven by the engine sufficiently accurate for operating without trouble, devices requiring constant frequencies, as for instance, electric clocks.

In another embodiment of the invention, the amplifier circuit is dispensed with. The plate circuits of the grid glow discharge devices are energized directly from the small pilot A. C. generator as before, but the phase shifter which controls the potential of the grids includes a potentiometer varied by means of a revolving ball governor coupled directly to the engine shaft, the solenoid being energized directly from the grid glow discharge devices without the intermediate D. C. generator, previously mentioned. In other respects, however, this circuit is the same.

Referring to the drawings:

Fig. 1 is a diagrammatic view of a Diesel engine and control circuit therefor incorporating the present improvements;

Fig. 2 is an enlarged diagrammatic view of the solenoid and fuel pump controlled thereby;

Fig. 3 is an enlarged diagrammatic view similar to Fig. 2, but showing a different type of solenoid;

Fig. 4 is a diagrammatic view of another embodiment of the invention, namely, one in which the phase shifter includes a resistance varied by a governor operated directly from the drive shaft of the engine; and Fig. 5 is an enlarged diagrammatic view of the governor shown in Fig. 4.

A prime mover A, herein illustrated (see Fig. 1) as a Diesel engine, is directly coupled to an A. C. generator B that supplies a series of load circuits (not shown), as for instance, domestic power or light circuits from which it may be desired to operate electric clocks or other apparatus requiring constant frequencies. A constant frequency presupposes a constant engine speed and, although mechanical governors have been long in use for regulating engine speeds under varying load conditions, such mechanical devices do not have the quickness of response necessary for maintaining the frequency conditions as accurate as is required by such apparatus, as electric clocks.

The speed of the Diesel engine is determined by a fuel pump C (Fig. 2) which can be controlled in such manner as to vary the quantity of fuel injected into the cylinders to raise or lower the speed, as desired. In accordance with the present improvements this pump is controlled from a solenoid D energized directly from a small D. C. generator E (Fig. 1) driven directly from the engine shaft, the current from the positive pole of the generator passing to the solenoid through the leads $e$, $e^4$, $e^1$ and returned from the solenoid through the leads $e^2$, $e^5$, $e^3$. The solenoid is biased by a spring $D^1$ connected to the armature thereof and anchored to a bracket $A^1$ on a fixed part of the engine. When the engine is running at normal speed to give the desired frequency, the current through the solenoid will be constant, and consequently the fuel delivered by the pump to the engine will be constant. However, should the speed of the engine drop below normal, the output of the D. C. generator E will be increased in the manner hereinafter described, to increase the flow of current to the solenoid D, thereby pulling its armature against the tension of the spring $D^1$ to increase the flow of fuel from the pump C to return the engine speed to normal, and likewise, when the speed of the engine is increased above normal, the output of the D. C. generator is decreased, so as to decrease the flow of current to the solenoid, which, under the action of the biasing spring $D^1$, will operate the fuel pump to decrease the flow of fuel and return the engine speed again to normal.

The D. C. generator E is provided with field coils $E^1$ and $E^2$, one of which is self-energized, and the other energized through a circuit, hereinafter described, from a small pilot A. C. generator F driven directly from the engine shaft. The output of the pilot A. C. generator is rectified by a pair of grid glow discharge devices G and H, connected in full wave rectification, the circuit for this purpose including a transformer J, the primary coil of which is connected directly to the output leads $F^1$, $F^2$ of the A. C. generator, and the secondary coil at its opposite ends to the anodes $G^1$, $H^1$ of the grid glow discharge tubes, respectively. A center tap $j$ in the secondary coil is connected through a lead $J^1$ with one end of the D. C. generator field coil $E^2$, the other end of the coil being connected through a lead $J^2$ to the cathodes $G^2$, $H^2$ of the grid glow discharge tubes. The grid circuits of the discharge tubes include a transformer K having its secondary coil connected at its opposite ends with the respective grids $G^3$, $H^3$ of the tubes, and a center tap $K^1$ connected to the cathodes $G^2$, $H^2$ thereof. The primary coil of the transformer K is connected at one end through a condenser $K^2$ with one end of a secondary coil of a transformer L and at its opposite end to a center tap $L^1$ of said secondary coil, the primary coil of the transformer L being connected across the output leads $F^1$, $F^2$ of the small pilot A. C. generator F. When the output of the A. C. generator is constant, which is the condition for normal engine speed, the plate circuit discharge of the tubes G, H, will occur at the same period of the cycle at all times. Consequently, the excitation of the field coils $E^1$, $E^2$ of the generator E will be constant, resulting in a constant supply of fuel being fed to the engine.

When the engine speed varies however, a corresponding variation will occur in the output of the pilot A. C. generator F, and this output variation is used to control the grid circuits of the grid glow discharge tubes in such a way that when the output is decreased, the current flowing to the field coil $E^2$ of the D. C. generator is increased, thereby actuating the solenoid in a manner to supply more fuel to the engine and increase its speed and vice versa when the output of the A. C. generator is increased.

In order to effect the control of the grid circuits of the tubes G, H by the pilot A. C. generator, a portion of the output thereof is shunted through a full wave rectifier M, the plates of which are connected across the output leads $F^1$, $F^2$ through a transformer $M^1$. The D. C. output of the rectifier M is passed through a filter $M^2$ of suitable character and applied across a resistance $M^3$ in bucking relation with a source of constant voltage, as for instance, a battery $M^4$. The voltage difference across the resistance $M^3$ is detected and amplified by a pair of screen grid space discharge tubes $M^4$, $M^5$ connected in tandem, the output of the second tube being impressed upon the grid $n$ of a three element space discharge tube N, the plate circuit of which is energized from the A. C. generator through the transformer L and which includes in series the condenser $K^2$, which likewise is in the circuit controlling the grids $G^3$, $H^3$ of the grid glow discharge tubes G, H. Variations in the plate current of the tube N flowing through the condenser $K^2$, as a result of the amplified variations in the output of the A. C. generator F, will act to shift the phase angle of the voltage applied to the grids $G^3$, $H^3$ of the glow discharge tubes G and H in a manner to cause the plate circuit discharge therein to occur earlier in the cycle when the output of the A. C. generator is decreased, so as to increase the current flowing to the exciter coil of the D. C. generator; and later in the cycle when the output of the A. C. generator is increased, thereby decreasing the flow of current to the exciter coils of the D. C. generator, with the result hereinbefore set forth.

Plate voltage for the tubes $M^4$ and $M^5$ is supplied by a full wave rectifier O connected through a transformer $O^1$ across the leads $F^1$, $F^2$, and the output of which is passed through a filter $O^2$ and applied across a resistance $O^3$ to which the plates of the tubes are connected at various points to obtain the desired voltage. The grid bias for the second tube $M^5$ is likewise obtained by tapping the resistance $O^3$ at a suitable point.

In order to render the operation of the device stable, there is provided an anti-hunting circuit connected across the field coil $E^1$ of the D. C. generator and which includes a potentiometer P in parallel with a resistance $P^1$ and condenser $P^2$, the resistance $P^1$ being in the grid circuit of the tube $M^4$. When the output voltage of the D. C. generator is constant, denoting normal running conditions, the voltage drop across the resistance $P^1$ is zero. If the voltage of the D. C. generator is changing due to the correcting action of the circuit, a charging current will flow into or a discharging current out of the condenser $P^2$. This current will produce a voltage drop across the resistance $P^1$ with a polarity, so as to oppose and diminish the unbalanced voltage conditions in the grid circuit of the tube M⁴ which caused the corrective action of the regulator.

Assuming that the speed of the engine is decreased, as a result of increased load on the generator B, the output of the pilot A. C. generator will be decreased with a corresponding decrease in voltage drop across the potentiometer M³, with the result that the grid voltage of the tube M⁴ will become less negative. Consequently, the current through the grid glow discharge devices G and H and the field circuit of the D. C. generator will increase, thus tending to bring the engine back to normal speed. As soon as the voltage of the D. C. generator E is increased, a voltage drop will appear across the resistance P¹, tending to make the grid of the detector tube M⁴ more negative, and the D. C. generator field current, which at this instant is considerably higher than prescribed by the new load conditions, will start to decrease before the regulator voltage is back to normal. In this way, the anti-hunting circuit anticipates the action of the regulator circuit and thus provides quick response and stable operation.

In Fig. 3, there is illustrated a solenoid Q² which can be substituted for the solenoid D, already described. Here the solenoid, instead of being biased by a spring, is biased by a weight Q¹, which, however, will not affect the operation of the circuit in any way.

In Fig. 4, there is illustrated another embodiment of the invention, wherein the D. C. generator is dispensed with. The engine R is the same as before and is arranged to operate a small pilot A. C. generator S coupled directly to the drive shaft thereof. The plate circuits of a pair of grid glow discharge devices T and U connected in full wave rectification are energized from the A. C. generator through a transformer V, a solenoid S¹ for controlling the fuel pump of the engine being connected in the common lead of the plate circuits which connects the cathodes of the grid glow discharge devices with a center tap of the transformer V. The grid circuits of the grid glow discharge tubes are controlled from the A. C. generator through a phase shifting circuit W, somewhat similar to that in the previously described embodiment of the invention, except that instead of a tube acting as a variable resistor, there is included in the circuit W, a variable resistance W¹ controlled from a mechanical governor W² on the engine. As shown in Fig. 5, the governor W² includes a vertical shaft W³ mounted for rotation in a fixed bracket on the engine and driven from the engine shaft through a pair of bevelled gears $w$ and $w^1$, the mounting of the vertical shaft being of a character as to eliminate as much friction as possible. At the top of the vertical shaft, there are fastened a pair of resilient bronze arms W⁴, W⁵ electrically connected together, as by a flexible wire W⁶, and which adjacent their lower ends are adapted to traverse a pair of potentiometers W⁷, W⁸, the resilient arms at their lower ends being provided with weights W⁹ to cause the arms to move in and out with variations in engine speed. The potentiometers are connected, respectively, through brushes W¹¹ to a pair of slip rings W¹⁰, which in turn serve to connect them in the phase shifting circuit. In other words, the variable resistance can be traced from one of the slip rings W¹⁰ through one of the potentiometers W⁷, an arm W⁴ of the governor, through the flexible connection W⁶ to the other arm W⁵ of the governor and back through the other potentiometer W⁸ to the other slip ring W¹⁰. According to this arrangement, when the engine speeds up, causing the weights at the bottom of the arms to fly outwardly, additional resistance is cut into the circuit, so as to shift the phase of the current therein in a manner to cause the grid glow discharge devices T and U to discharge at a later period in the cycle, thus decreasing the flow of current to the solenoid with a consequent reduction in engine speed, and likewise when the speed of the engine is reduced below normal, allowing the weights to move inwardly, cutting resistance out of the circuit, so as to shift the phase of the current in a manner to cause the grid glow discharge devices to discharge at an earlier period of the cycle, thus increasing the flow of current to the solenoid S¹, with a consequent increase in engine speed. The A. C. generator S is wound so as to give almost constant voltage over a small speed range, and the governor can be made very small and sensitive, since the only work it performs is that necessary to overcome the resistance to friction consequent upon the arms W⁴, W⁵ sliding along the potentiometers W⁷ and W⁸.

This embodiment, like that previously described, has very little time lag and can be made sufficiently sensitive to maintain the speed of the engine, and consequently the frequency of the work generator, constant within a very small percentage of error, namely, well under 1%, which is sufficient for such purposes, as for instance, the operation of time clocks, etc.

In the accompanying drawings, the invention has been shown merely by way of example and in preferred form, and obviously many variations and modifications may be made therein which will still be comprised within its spirit. For instance, in the embodiments heretofore described, certain portions of the circuits which are controlled by the alternating current generator for regulating the flow of current through the solenoid are known, and it is intended that any other circuit which will act in a similar fashion could be readily substituted therefor. It is to be understood, therefore, that the invention is not limited to any specific form or embodiment, except insofar as such limitations are specified in the appended claims.

Having thus described my invention, what I claim is:

1. A device for controlling the speed of a prime mover, which includes, in combination, a throttle for regulating the flow of operating medium to the prime mover, electrical means for operating said throttle, means for energizing said electrical means including a direct current generator coupled with the prime mover, an armature circuit for the direct current generator and in which said electrical means is connected, a field circuit for said generator electronic devices in said field circuit of said generator, and means controlled by the prime mover for varying the flow of current from the electronic devices through the field circuit of said generator thereby to regulate the flow of current to said electrical means in a manner to increase the flow of operating medium to the prime mover when the speed of the latter is reduced and reduce the flow of operating medium to the prime mover when the speed thereof is increased.

2. A device for controlling the speed of a prime mover, which includes, in combination, a throttle for regulating the flow of operating medium to the prime mover, electrical means for operating said throttle, means for energizing said electrical means including a direct current generator coupled with the prime mover, an armature circuit for the direct current generator and in which said electrical means is connected, a field circuit for said generator, electronic devices in said field circuit and an A. C. generator likewise coupled with the prime mover and in circuit with said electronic devices, and means controlled by the prime mover for varying the flow of current from the electronic devices through the field circuit of said generator thereby to regulate the flow of current to said electrical means in a manner to increase the flow of operating medium to the prime mover when the speed of the latter is reduced and reduce the flow of operating medium to the prime mover when the speed thereof is increased.

3. A combination according to claim 1 wherein the throttle operating means comprises a solenoid.

4. A device for controlling the speed of a prime mover, which includes, in combination, a throttle for regulating the flow of operating medium to the prime mover, electrical means for operating said throttle, means for energizing said electrical means including electronic devices in circuit with an alternating current generator operated by the prime mover, and means for controlling the flow of current through the electronic devices to effect the operation of said electrical means in a manner to increase the flow of operating medium to the prime mover when the speed of the latter is reduced and to reduce the flow of operating medium to the prime mover when the speed of the latter is increased, said means including a circuit energized from the output of the alternating current generator and having therein a resistance variable in accordance with variations in the speed of the prime mover.

5. A device for controlling the speed of a prime mover, which includes, in combination, a throttle for regulating the flow of operating medium to the prime mover, electrical means for operating said throttle, means for energizing said electrical means including electronic devices in circuit with an alternating current generator operated by the prime mover, and means for controlling the flow of current through the electronic devices to effect the operation of said electrical means in a manner to increase the flow of operating medium to the prime mover when the speed of the latter is reduced and to reduce the flow of operating medium to the prime mover when the speed of the latter is increased, said means including a circuit energized from the output of the alternating current generator and having therein a resistance variable in accordance with variations in the speed of the prime mover by a governor driven directly from the shaft thereof.

6. A device for controlling the speed of a Diesel engine adapted to operate a generator for energizing a load circuit and which includes, in combination, a fuel pump for determining the flow of fuel to the engine, electrical means for controlling the operation of the pump, electronic means having an output circuit controlling said electrical means and adapted when the flow of current through said output circuit has a given value to maintain a given operating condition for the electrical means controlling the pump, an input circuit for said electronic means, and means in said input circuit and controlled by the Diesel engine for varying the flow of current in the output circuit of said electronic means above or below said given value, whereby to increase the flow of fuel to the Diesel engine when the speed thereof is reduced and to reduce the flow of fuel to said Diesel engine when the speed thereof is increased.

7. A device for controlling the speed of a Diesel engine adapted to operate a generator for energizing a load circuit and which includes, in combination, a fuel pump for determining the flow of fuel to the engine, a biased solenoid for regulating the action of the pump, electrical means for operating said solenoid, means for energizing said electrical means and including electronic devices in circuit with an alternating current generator driven by the engine independently of the load circuit generator, and means controlled by the engine for varying the flow of current from the electronic devices to said electrical means in a manner to increase the flow of fuel from the pump to the engine when the speed of the latter is reduced and to reduce the flow of fuel from the pump to the engine when the speed of the latter is increased.

8. A device for controlling the speed of a prime mover adapted to operate a generator for energizing a load circuit and which includes, in combination, a throttle for regulating the flow of operating medium to the prime mover, electrical means for operating said throttle, electronic means having an output circuit controlling said electrical means, and adapted when the flow of current through said output circuit has a given value to maintain a given operating condition for the electrical means associated with the throttle, an input circuit for the electronic means, an alternating current generator driven by the prime mover independently of the load circuit generator and from which the input circuit of the electronic means is energized, and means in said input circuit and controlled by the prime mover for varying the flow of current in the output circuit of said electronic means above or below said given value, whereby to increase the flow of operating medium to the prime mover when the speed thereof is reduced and to reduce the flow of operating medium to the prime mover when the speed thereof is increased.

9. A control device according to claim 8, wherein the electrical means for operating the throttle includes a solenoid.

10. A device for controlling the speed of a prime mover adapted to operate a generator for energizing a load circuit and which includes, in combination, a throttle for regulating the flow of operating medium to the prime mover, electrical means for operating said throttle, electronic means having an output circuit from which said electrical means is controlled, an input circuit for the electronic means, an alternating current generator driven by the prime mover independently of the load circuit generator and from which the input circuit of the electronic means is energized, and means including a governor driven by the prime mover and operating electrically to control the flow of current through said electronic devices in a manner to increase the flow of operating medium to the prime mover when the speed thereof is reduced and to reduce the flow of operating medium to the prime mover when the speed thereof is increased.

11. A device for controlling the speed of a prime mover adapted to operate a generator for energizing a load circuit and which includes, in combination, a throttle for regulating the flow of operating medium to the prime mover, electrical means for operating said throttle, electronic means having an output circuit controlling said electrical means, and adapted when the flow of current through said output circuit has a given value to maintain a given operating condition for the electrical means associated with the throttle, an input circuit for the electronic means, an alternating current generator driven by the prime mover independently of the load circuit generator and from which the input circuit of the electronic means is energized, and means in said input circuit and controlled from the alternating current generator for varying the flow of current in the output circuit of said electronic means above or below said given value, whereby to increase the flow of operating medium to the prime mover when the speed thereof is reduced and to reduce the flow of operating medium to the prime mover when the speed thereof is increased.

JOHN J. BAIER.

CERTIFICATE OF CORRECTION.

Patent No. 2,161,693. June 6, 1939.

JOHN J. BAIER.

It is hereby certified that error appears in the printed specification of the above numbered patent requiring correction as follows: Page 3, second column, line 62, claim 1, after "generator" insert a comma; line 63, same claim, strike out the words "of said generator"; and that the said Letters Patent should be read with this correction therein that the same may conform to the record of the case in the Patent Office.

Signed and sealed this 4th day of July, A. D. 1939.

Henry Van Arsdale (Seal)

Acting Commissioner of Patents.